United States Patent
Hasegawa

(10) Patent No.: US 11,300,024 B2
(45) Date of Patent: Apr. 12, 2022

(54) HEAT EXCHANGER

(71) Applicant: TOYOTA JIDOSHA KABUSHIKI KAISHA, Aichi-ken (JP)

(72) Inventor: Ryo Hasegawa, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 53 days.

(21) Appl. No.: 16/581,568

(22) Filed: Sep. 24, 2019

(65) Prior Publication Data

US 2020/0157992 A1 May 21, 2020

(30) Foreign Application Priority Data

Nov. 21, 2018 (JP) .............................. JP2018-218308

(51) Int. Cl.
*F01N 3/04* (2006.01)
*F28F 3/04* (2006.01)

(52) U.S. Cl.
CPC ................ *F01N 3/046* (2013.01); *F28F 3/04* (2013.01); *F01N 2510/08* (2013.01); *F28F 2245/02* (2013.01)

(58) Field of Classification Search
CPC ...... F28F 3/04; F28F 3/06; F28F 13/18; F28F 19/02–06; F28F 2245/02; F28F 2245/04; F28D 1/0366; F28D 7/0025; F28D 7/1653; F28D 9/0031; F28D 9/0081; F28D 2021/008; F28D 2021/0082; F01N 3/043; F01N 3/046; F01N 2240/02; F01N 2510/06; F01N 2510/08; F02M 26/11; F02M 26/29; F02M 26/32; F02M 26/50; F02M 31/20; F02B 29/0437; F02B 29/045; F02B 29/0462; F02B 29/0475
See application file for complete search history.

(56) References Cited

U.S. PATENT DOCUMENTS 4,434,844 A * 3/1984 Sakitani .................. F28F 1/325
165/133
4,660,532 A * 4/1987 Tholen ................ F02B 29/0431
123/563

(Continued)

FOREIGN PATENT DOCUMENTS

CN 101013008 A 8/2007
CN 105485971 A 4/2016
(Continued)

*Primary Examiner* — Paul Alvare
*Assistant Examiner* — Jose O Class-Quinones
(74) *Attorney, Agent, or Firm* — Hauptman Ham, LLP

(57) ABSTRACT

In a heat exchanger installed on an intake path or exhaust path of an internal combustion engine and configured to cool gas by transferring heat between the gas containing exhaust and refrigerant, a water-repellent portion is formed at part of a portion that contacts the gas in a gas path through which the gas flows, and a hydrophilic portion is formed at another part of the portion. The water-repellent portion is a portion provided with water-repellent treatment. The hydrophilic portion is a portion provided with hydrophilic treatment. The hydrophilic portion is formed at a part having a temperature lower than the temperature of the part at which the water-repellent portion is formed while the heat exchanger is actuated.

9 Claims, 10 Drawing Sheets

(56) References Cited

U.S. PATENT DOCUMENTS

| | | | | |
|---|---|---|---|---|
| 5,732,688 | A * | 3/1998 | Charlton | F02D 21/08 123/568.12 |
| 5,785,030 | A * | 7/1998 | Paas | F01N 3/04 60/278 |
| 6,269,870 | B1 * | 8/2001 | Banzhaf | F28F 9/001 165/158 |
| 6,360,532 | B2 * | 3/2002 | Strahle | F28D 9/0037 123/568.12 |
| 6,595,274 | B2 * | 7/2003 | Hayashi | F28F 9/0219 165/158 |
| 7,055,586 | B2 * | 6/2006 | Sakakibara | F28D 7/1684 138/38 |
| 7,571,718 | B2 * | 8/2009 | Hendrix | F28D 7/1684 123/563 |
| 7,806,170 | B2 * | 10/2010 | Nakamura | F28D 7/1684 165/158 |
| 7,857,039 | B2 * | 12/2010 | Nakamura | F02M 26/32 165/157 |
| 7,984,753 | B2 * | 7/2011 | Ohfune | F02M 26/32 165/166 |
| 8,708,036 | B2 * | 4/2014 | Ikeda | F28D 7/1684 165/157 |
| 8,720,199 | B2 * | 5/2014 | Gaensler | F02M 26/32 60/599 |
| 9,804,607 | B1 * | 10/2017 | Coleman | B23P 11/00 |
| 9,938,936 | B2 * | 4/2018 | Kim | F28F 3/02 |
| 2002/0074105 | A1 * | 6/2002 | Hayashi | F02M 26/32 165/43 |
| 2003/0010479 | A1 * | 1/2003 | Hayashi | F28D 7/1684 165/157 |
| 2003/0010480 | A1 * | 1/2003 | Shibagaki | F28D 9/0031 165/158 |
| 2004/0035561 | A1 * | 2/2004 | Ko | F28F 13/04 165/133 |
| 2006/0011333 | A1 * | 1/2006 | Emrich | F28F 9/001 165/167 |
| 2006/0219394 | A1 * | 10/2006 | Martin | F28F 3/025 165/157 |
| 2007/0193732 | A1 * | 8/2007 | Oofune | F28D 9/0031 165/164 |
| 2013/0133871 | A1 * | 5/2013 | Ma | H01L 23/427 165/185 |
| 2013/0168050 | A1 * | 7/2013 | Chauhan | H01L 23/427 165/104.21 |
| 2013/0240176 | A1 * | 9/2013 | Lee | F28F 1/24 165/59 |
| 2014/0086803 | A1 * | 3/2014 | Cattani | F02B 37/013 422/170 |
| 2014/0366568 | A1 * | 12/2014 | Kim | F28F 1/12 62/272 |
| 2015/0260436 | A1 * | 9/2015 | Kim | F28F 1/32 165/133 |
| 2017/0292433 | A1 * | 10/2017 | Hayashita | F01N 11/007 |
| 2017/0306894 | A1 * | 10/2017 | Kikuchi | F02M 26/32 |
| 2018/0274868 | A1 * | 9/2018 | Ehegartner | F28F 19/04 |
| 2018/0283526 | A1 * | 10/2018 | Sung | F16H 57/0441 |

FOREIGN PATENT DOCUMENTS

| | | |
|---|---|---|
| JP | 2003-184659 A | 7/2003 |
| JP | 2006-348873 A | 12/2006 |
| JP | 2007192513 A | 8/2007 |
| JP | 2014-222645 A | 11/2014 |
| JP | 2014224645 A | 12/2014 |
| JP | 2015-98947 A | 5/2015 |

* cited by examiner

HEAT EXCHANGER

CROSS-REFERENCE TO RELATED APPLICATION

The present application claims priority under 35 U.S.C. § 119 to Japanese Patent Application No. 2018-218308, filed Nov. 21, 2018. The contents of this application are incorporated herein by reference in their entirety.

BACKGROUND

Field

The present disclosure relates to a heat exchanger. More specifically, the present disclosure relates to a heat exchanger installed on an intake path or exhaust path of an internal combustion engine and configured to transfer heat between gas containing exhaust and refrigerant.

Background

Typically, a vehicle includes a plurality of heat exchangers such as an intercooler and an EGR cooler. In each heat exchanger, steam in circulating gas is cooled and condensed and adheres in a gas path as a liquid film. Various technologies of removing such a droplet have been disclosed.

For example, JP 2006-348873 A discloses that an oil-repellent film is formed on the inner wall surface of the path of EGR gas in the EGR cooler to promote ejection of an oil component containing unburned fuel generated through condensation of the EGR gas.

SUMMARY

In a heat exchanger such as an EGR cooler in which gas containing exhaust is cooled, deposit is generated on the gas path of the heat exchanger due to unburned fuel components and soot in exhaust and adheres in the gas path in some cases. Soluble deposit in the adhering deposit dissolves into condensation water and is discharged from the heat exchanger together with the condensation water.

When an oil-repellent film is formed on the inner wall surface of the EGR gas path of the EGR cooler as in the technology disclosed in the above-described JP 2006-348873 A, the oil-repellent film is thought to provide effects similarly to water-repellent treatment. Specifically, the oil-repellent film is thought to promote ejection of condensation water generated in the gas path of the EGR cooler. Accordingly, the soluble deposit potentially does not dissolve into the condensation water but remains in the gas path.

It is an object of an example in the present disclosure to provide a technology of reducing deposit adhesion in a gas path of a heat exchanger configured to exchange heat between gas containing exhaust and refrigerant.

A heat exchanger according to an example in the present disclosure is installed on an intake path or exhaust path of an internal combustion engine. The heat exchanger configured to transfer heat between gas containing exhaust and refrigerant. The heat exchanger includes a gas path through which the gas flows and a refrigerant path through which the refrigerant flows. A water-repellent portion provided with water-repellent treatment is formed at part of a portion that contacts the gas in the gas path. A hydrophilic portion provided with hydrophilic treatment is formed at part of the portion that contacts the gas in the gas path, the part being different from the water-repellent portion and having a temperature lower than the temperature of the water-repellent portion while the heat exchanger is actuated.

A water-repellent portion is disposed on a high-temperature side in a gas path to promote ejection of condensation water. Accordingly, on the high-temperature side in the gas path, the storage amount of water in the gas path can be reduced and removal of deposit due to peeling at high temperature can be promoted. In addition, a hydrophilic portion is provided on a low-temperature side in the gas path to dissolve deposit generated at low temperature into condensation water. With the hydrophilic portion, the condensation water penetrates between the deposit and the surface of the gas path, thereby promoting removal of the deposit due to peeling.

DESCRIPTION OF EMBODIMENTS

Figure 1:
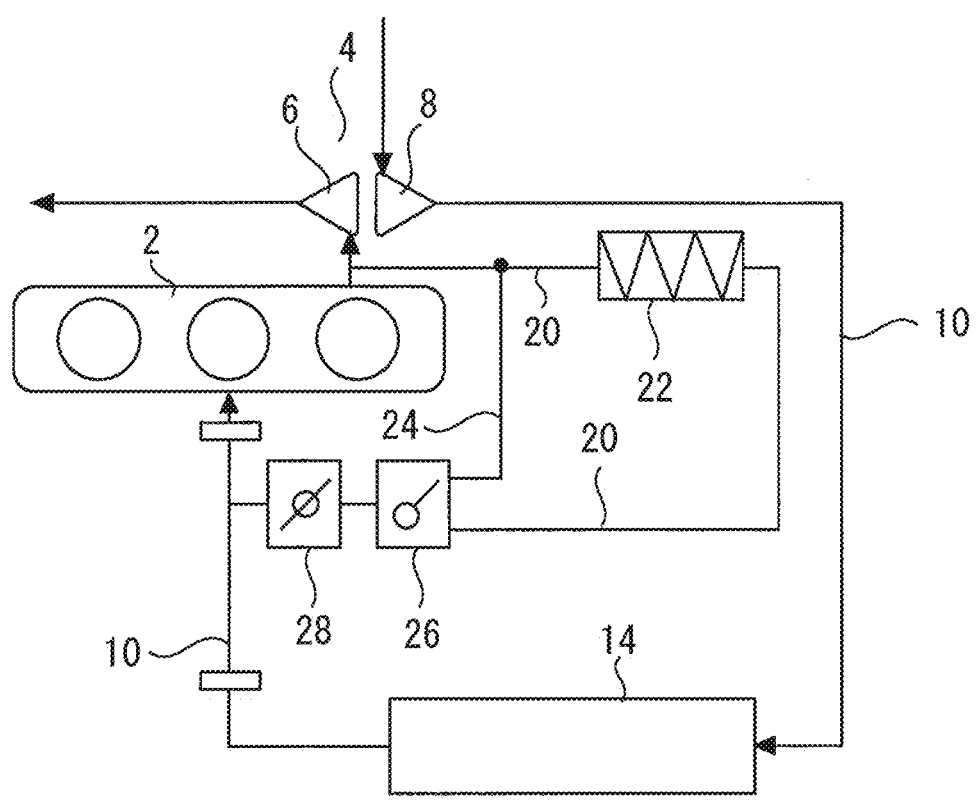
FIG. 1 is a diagram schematically illustrating an entire configuration of a system according to a first embodiment of the present disclosure.

The following describes embodiments of the present disclosure with reference to the accompanying drawings. In the drawings, parts identical or equivalent to each other are denoted by an identical reference sign, and duplicate description thereof will be simplified or omitted.

First Embodiment

1. Exemplary Configuration of System According to First Embodiment
1-1. Exemplary Entire Configuration FIG. 1 is a diagram schematically illustrating the entire configuration of a system according to a first embodiment of the present disclosure. The system in FIG. 1 includes an engine 2. The engine 2 includes a supercharger 4. The supercharger 4 includes a turbine 6 configured to be actuated by exhaust energy, and a compressor 8 integrally coupled with the turbine 6 and configured to be rotated by the exhaust energy input to the turbine 6. The compressor 8 is disposed halfway through an intake path 10.

An intercooler 14 is installed downstream of the compressor 8 in the flow of intake air on the intake path 10. The intercooler 14 is a heat exchanger configured to cool, through heat exchange with refrigerant, the intake air compressed by the compressor 8. The refrigerant in the intercooler 14 is, for example, water. However, the refrigerant may be other than water.

The engine 2 also includes an EGR device configured to recirculate part of exhaust as EGR gas to the intake path 10. The EGR device includes an EGR path 20 connecting an exhaust system and an air intake system of the engine 2. An EGR cooler 22 is installed on the EGR path 20. The EGR cooler 22 is a heat exchanger configured to cool the exhaust through heat exchange that transfers heat between the exhaust and refrigerant. The refrigerant in the EGR cooler 22 is, for example, water. However, the refrigerant may be other than water.

The EGR path 20 is connected with a bypass path 24 bypassing the EGR cooler 22 in parallel to the EGR cooler 22. A valve 26 for opening and closing the bypass path 24 is installed at a part at which the bypass path 24 merges with the EGR path 20. An EGR valve 28 for adjusting the amount of the EGR gas is installed downstream of the valve 26 in the flow of the EGR gas on the EGR path 20.

1-2. Exemplary Configuration of EGR Cooler

Figure 2:
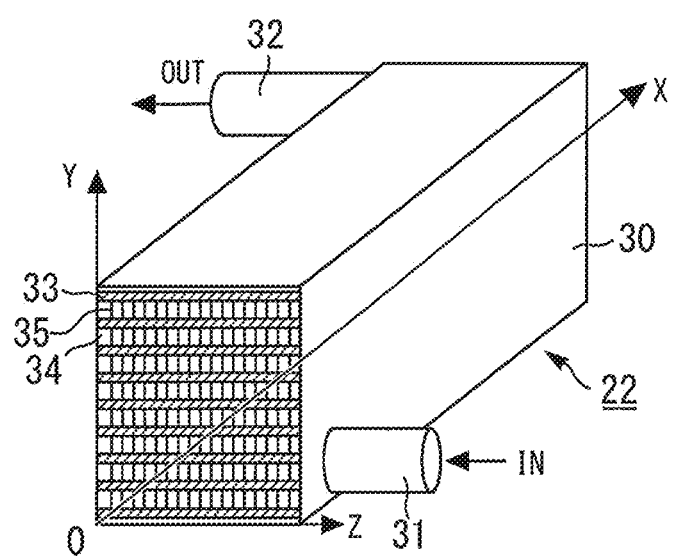
FIG. 2 is a diagram schematically illustrating a configuration of an EGR cooler according to the first embodiment of the present disclosure.

FIG. 2 is a diagram schematically illustrating the configuration of the EGR cooler 22. Hereinafter, as illustrated in FIG. 2, an X axis is defined to be in a direction substantially parallel to flow in the direction of gas circulation in the EGR cooler 22, the origin (0) is defined to be on the most upstream side, and the positive side is defined to be on the downstream side. A Y axis is defined to be in the up-down direction of the EGR cooler 22, the origin is defined to be on the bottom surface side, and the positive side is defined to be on the upper surface side. A Z axis is defined to be in a direction orthogonal to an XY plane, the origin is defined to be on a side closer to a side surface on which a refrigerant outlet 32 is formed, and a refrigerant inlet 31 is formed on a side surface on the positive side.

As illustrated in FIG. 2, the EGR cooler 22 includes a refrigerant path 33 and a gas path 34. The refrigerant path 33 includes a plurality of tubes. Each tube included in the refrigerant path 33 is fixed in parallel to each other in a housing 30 of the EGR cooler 22. The refrigerant path 33 is a path of refrigerant and connects the refrigerant inlet 31 and the refrigerant outlet 32 formed on any of side surfaces of the housing 30. The refrigerant inlet 31 is formed upstream in the gas flow and on the lower side on the side surface of the housing 30 on the positive side of the Z axis. That is, refrigerant inlet 31 is formed on the side closer to the origin of the XY plane on the side surface of the housing 30 on the positive side of the Z axis. The refrigerant outlet 32 is formed downstream in the gas flow and on the upper side on the side surface of the housing 30 on a side closer to the origin of the Z axis. That is, the refrigerant outlet 32 is formed on the positive side of the X axis and the positive side of the Y axis on the side surface of the housing 30 on a side closer to the origin of the Z axis.

A part between the tubes of the refrigerant path 33 serves as the gas path 34. The gas path 34 is disposed separately from and in parallel to the refrigerant path 33. A plurality of heat-releasing fins 35 are disposed in the gas path 34. Each fin 35 is, for example, a member bent in a concave-convex YZ sectional shape by pressing a metal plate or the like having a high thermal conductivity. However, the fin 35 is not limited to the metal plate, and the formation method thereof is not limited to the pressing. The fins 35 having the high thermal conductivity are disposed in the gas path 34 to increase the surface area inside the gas path 34, thereby improving the thermal conductivity of the heat exchanger.

2. Characteristics of Deposit Generated in Gas Path

In the gas path 34 of the EGR cooler 22, deposit is generated from unburned fuel components and soot contained in the EGR gas, and adheres to a portion that contacts the gas in the gas path 34 in some cases. Hereinafter, the portion that contacts the gas in the gas path 34 is also referred to as a "gas path surface" for simplification. In the present embodiment, the gas path surface includes not only an inner wall surface of the gas path 34 but also the surface of each fin 35.

Figure 3:
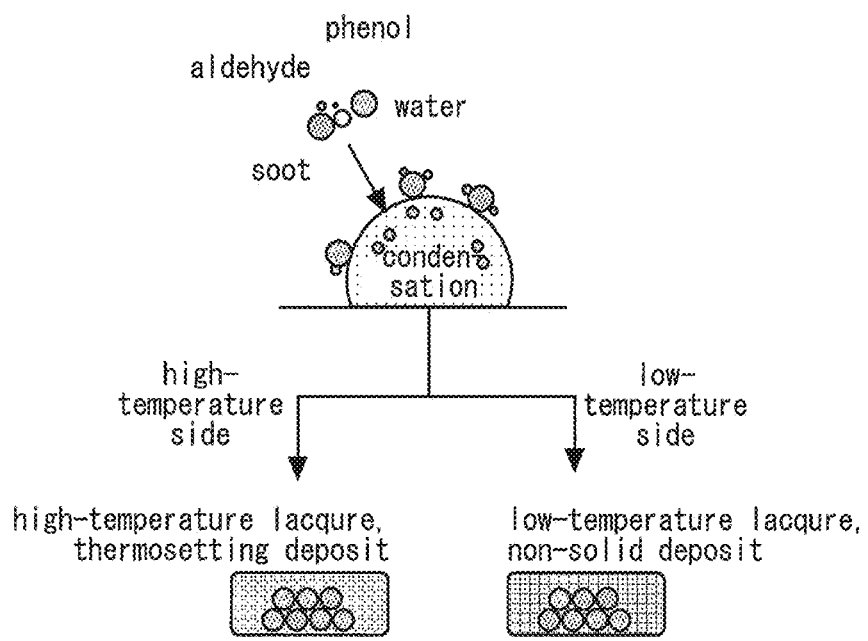
FIG. 3 is a diagram for description of mechanism of deposit generation and peeling in a gas path of an EGR cooler.

Characteristics of the deposit generated in the gas path 34 differ with the temperature at the generation. FIG. 3 is a diagram for description of the mechanism of deposit generation and peeling in the gas path 34. As illustrated in FIG. 3, when condensation water is combined with unburned fuel components, soot, and the like in the gas path 34, high-temperature lacquer and thermosetting deposit are generated in a high-temperature region. The deposit and the like generated in the high-temperature region are insoluble. Low-temperature lacquer and non-solid deposit are generated in large amounts on the low-temperature side.

Figure 4:
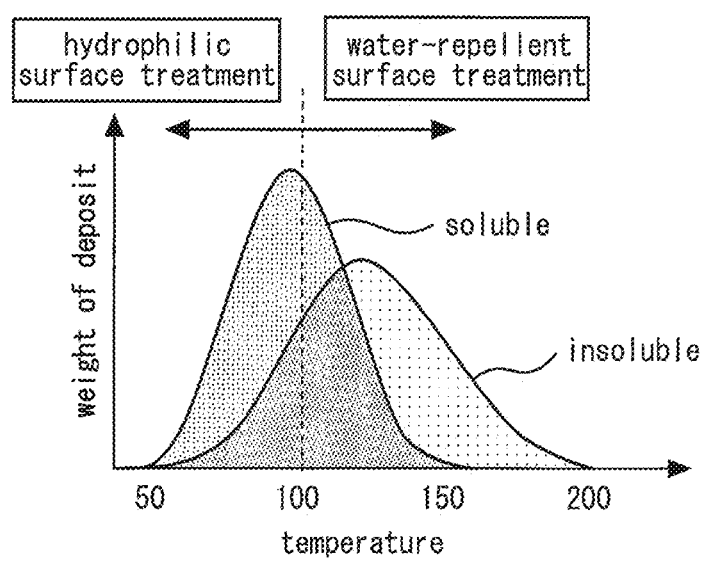
FIG. 4 is a diagram illustrating the relation between weight of generated deposit and temperature at the generation.

FIG. 4 is a diagram illustrating the relation between the weight of generated deposit and the temperature at the generation. As illustrated in FIG. 4, a large amount of soluble deposit is generated in a region in which the temperature is lower, and a large amount of insoluble deposit is generated in a region in which the temperature is higher. More specifically, a large amount of insoluble deposit is generated on the high-temperature side, and the weight of the insoluble deposit has a peak on the high-temperature side of more than 100°. The weight of soluble deposit has a peak at a temperature slightly lower than 100°, and the soluble deposit is generated in a low-temperature region.

3. Water-Repellent Surface Treatment and Hydrophilic Surface Treatment in Gas Path 3-1. Outline Since deposit has the above-described temperature characteristics, the gas path surface is provided with water-repellent surface treatment at a part at which the gas path surface has a relatively high temperature. Accordingly, accumulation of the condensation water is reduced on the high-temperature side to promote water discharge, thereby reducing the storage amount of the condensation water. In addition, since the temperature of the gas path surface is kept higher, peeling of deposit from the gas path surface is promoted by the high temperature.

The gas path surface is provided with hydrophilic surface treatment at a part at which the gas path surface has a relatively low temperature. Accordingly, deposit generated at a low temperature can be effectively removed through dissolution into the condensation water. In addition, the condensation water can penetrate between the gas path surface and deposit through the hydrophilic surface treatment, thereby promoting removal of deposit due to peeling.

3-2. Temperature Distribution in EGR Cooler

Figure 5:
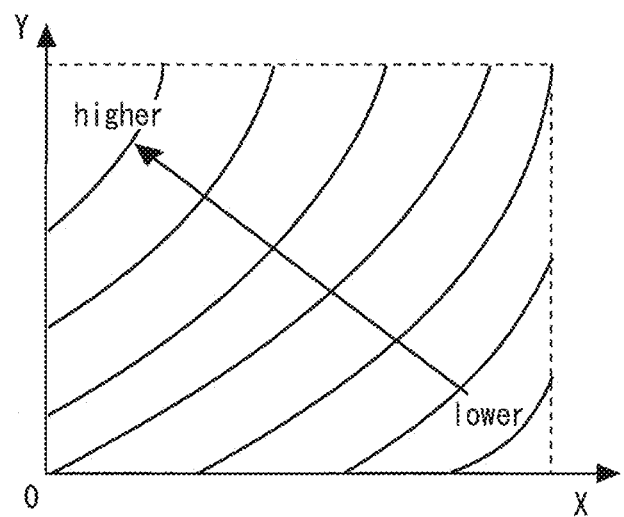
FIG. 5 is a diagram illustrating an example of temperature distribution of a gas path surface at an optional XY plane in an EGR cooler according to the first embodiment of the present disclosure.
Figure 6:
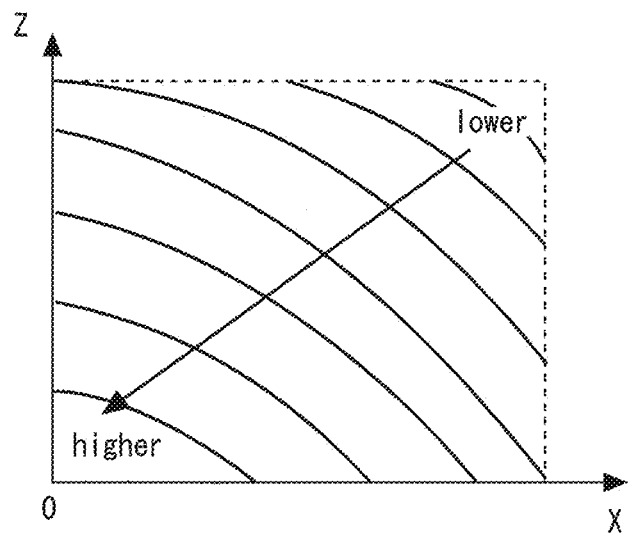
FIG. 6 is a diagram illustrating an example of temperature distribution of a gas path surface at an optional XZ plane in the EGR cooler according to the first embodiment of the present disclosure.

The following describes temperature distribution in the EGR cooler 22. FIG. 5 is a diagram illustrating temperature distribution of the gas path surface at an optional XY plane in the EGR cooler 22, and FIG. 6 is a diagram illustrating the temperature distribution of the gas path surface at an optional XZ plane in the EGR cooler 22. In the present embodiment, the gas path 34 is disposed in parallel to the X axis, and the EGR gas flows substantially in parallel to the X axis in the positive direction from the X-axis origin side. Accordingly, temperature change in the X-axis direction has a tendency as follows: as illustrated in FIGS. 5 and 6, the temperature is higher (for example, 80° to 400° approximately) on the inlet side (X-axis origin side) of the gas path 34, and the temperature of the gas path surface becomes lower close to the temperature of the refrigerant (for example, 40° approximately) at a position closer to the outlet side.

The refrigerant inlet 31 of the EGR cooler 22 is formed on the side closer to the origin of the XY plane on the side surface on the positive side of the Z axis, and the refrigerant outlet 32 is formed on the positive sides of the X and Y axes on the side surface on the Z-axis origin side. Thus, the refrigerant circulates in a ZY plane from the positive side of the Z axis to the origin side, and also circulates from the Y axis origin side to the positive side. Accordingly, temperature change in the Y-axis direction has a tendency as follows: as illustrated in FIG. 5, the temperature is high on the positive side and low on the origin side. Temperature change in the Z-axis direction has a tendency as follows: as illustrated in FIG. 6, the temperature is low on the positive side and high on the origin side.

In this manner, the temperature distribution in the EGR cooler 22 depends on the flow of the EGR gas and the flow of the refrigerant. Thus, the temperature of the gas path surface while the EGR cooler 22 is actuated after the engine 2 is warmed up can be estimated from the flow of the EGR gas and the flow of the refrigerant to some extent.

Figure 7:
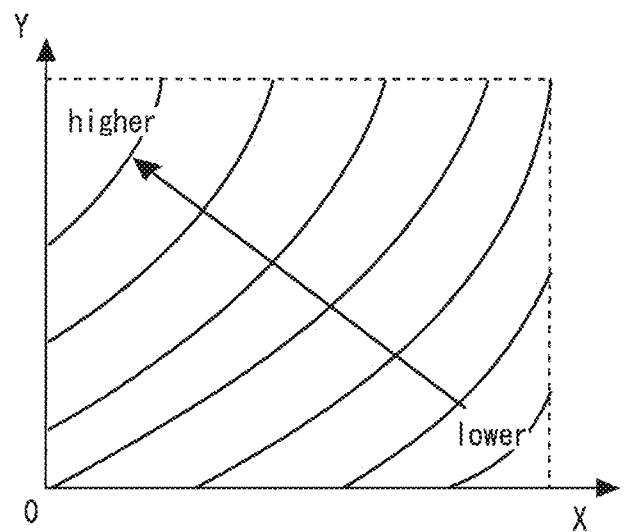
FIG. 7 is a diagram illustrating an example of water-repellent property distribution of the gas path surface at an optional XY plane in the EGR cooler according to the first embodiment of the present disclosure.
Figure 8:
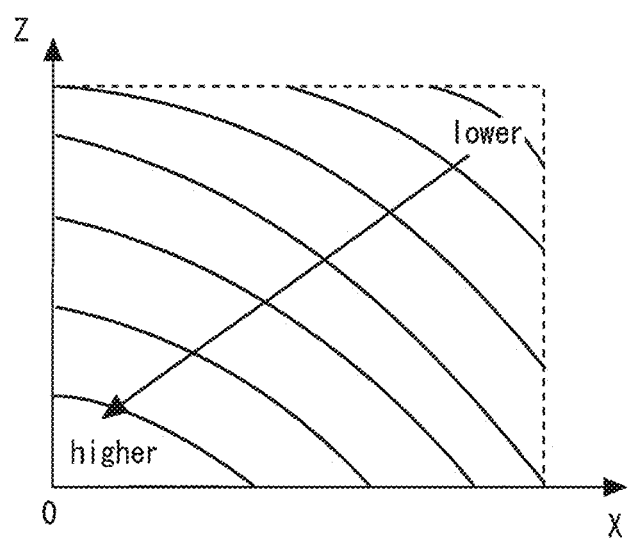
FIG. 8 is a diagram illustrating an example of water-repellent property distribution of the gas path surface at an optional XZ plane in the EGR cooler according to the first embodiment of the present disclosure.

3-3. Reference for Division between Part Forming Water-Repellent Film and Part Forming Hydrophilic Film FIGS. 7 and 8 are diagrams illustrating preferable water-repellent property distribution in accordance with temperature distribution in the gas path. As described above, in the present embodiment, the gas path surface has a higher temperature at a position further on the origin side in the X-axis and Z-axis directions and further on the positive side in the Y-axis direction, and has a lower temperature at a position further on the positive side in the X-axis and Z-axis directions and further on the origin side in the Y-axis direction. As illustrated in FIG. 4, the amount of insoluble deposit is larger at a position further on the high-temperature side, and the amount of soluble deposit is larger at a position further on the low-temperature side.

Thus, the gas path surface is provided with surface treatment so that, ideally, the water-repellent property is higher on the high-temperature side and gradually becomes lower (in other words, the hydrophilic property becomes higher) as the temperature decreases in accordance with the temperature distribution of the gas path surface as illustrated in FIGS. 7 and 8. However, the change of the water-repellent property does not need to precisely match with the temperature distribution, but the water-repellent property may change gradually or at a plurality of stages in accordance with the temperature distribution.

Figure 9:
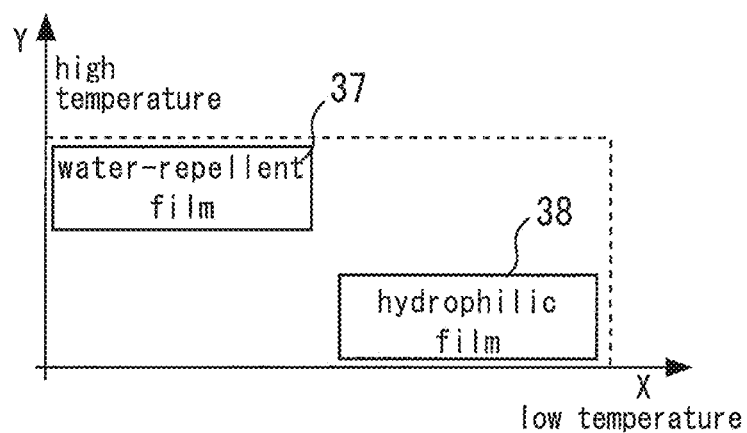
FIG. 9 is a diagram illustrating an exemplary arrangement of water-repellent film and hydrophilic film at an optional XY plane in the EGR cooler according to the first embodiment of the present disclosure.
Figure 10:
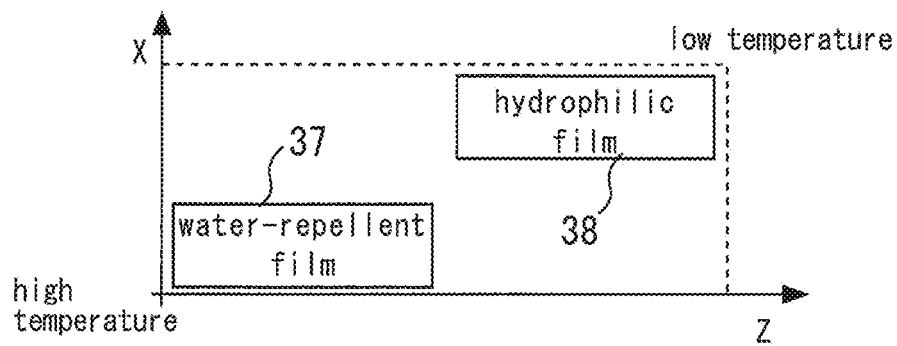
FIG. 10 is a diagram illustrating an exemplary arrangement of water-repellent film and hydrophilic film at an optional XZ plane in the EGR cooler according to the first embodiment of the present disclosure.

When the water-repellent property of the gas path surface is changed gradually or at stages, the number of treatment processes increases in accordance with increase of the stages of the change. Thus, to avoid the increase of the number of treatment processes, a water-repellent film 37 may be formed on the gas path surface on the high-temperature side, and a hydrophilic film 38 may be formed on the gas path surface on the low-temperature side as illustrated in FIGS. 9 and 10.

More specifically, in the present embodiment, a reference temperature corresponding to a boundary between the water-repellent film 37 and the hydrophilic film 38 is 100°. A water-repellent portion provided with the water-repellent surface treatment and coated with the water-repellent film 37 is formed on the high-temperature side on which the temperature of the gas path surface is expected to be equal to or higher than 100° while the EGR cooler 22 is actuated in a normal operation after the engine is warmed up. A hydrophilic portion provided with the hydrophilic surface treatment and coated with the hydrophilic film is formed on the low-temperature side on which the temperature of the gas path surface is expected to be lower than 100°.

The water-repellent surface treatment or the hydrophilic surface treatment cannot be provided with a precise boundary based on the reference temperature, due to the configuration of the gas path surface in some cases. In such a case, the water-repellent film 37 or the hydrophilic film 38 is formed at each part at which the water-repellent surface treatment or the hydrophilic surface treatment can be provided. Specifically, the part is coated with the water-repellent film 37 in a case in which the part is expected to have an average surface temperature equal to or higher than 100° while the EGR cooler 22 is actuated when the part is disposed in the gas path 34 of the EGR cooler 22, or the part is coated with the hydrophilic film 38 in a case in which the average surface temperature is expected to be lower than 100°. Accordingly, the gas path 34 can be formed with the hydrophilic property and the water-repellent property selectively provided in accordance with the temperature distribution of the gas path surface to some extent.

The reference temperature as a temperature corresponding to division in formation of the water-repellent film 37 and the hydrophilic film 38 does not necessarily need to be 100°. For example, the reference temperature may be set to be a temperature at which soluble deposit and insoluble deposit can be effectively ejected for each engine on which the heat exchanger is mounted, and the temperature may be calculated through simulation or the like and set as appropriate.

3-4. Method of Forming Water-Repellent Film and Hydrophilic Film

Figure 11:
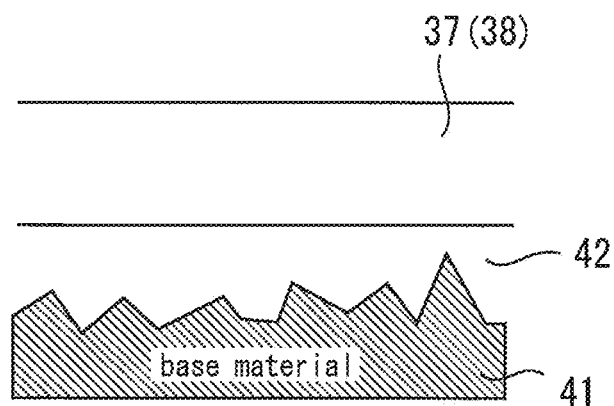
FIG. 11 is a pattern diagram illustrating outline of a method of forming the water-repellent film and the hydrophilic film according to the first embodiment of the present disclosure.

FIG. 11 is a pattern diagram illustrating the outline of a method of forming the water-repellent film and the hydrophilic film. As illustrated in FIG. 11, an undercoat 42 for close contact and wettability is provided on a base material 41 of each fin 35, the wall surface of the gas path 34, or the like, and the water-repellent surface treatment or the hydrophilic surface treatment is provided on the undercoat 42 to form the water-repellent film 37 or the hydrophilic film 38.

Examples of the water-repellent surface treatment include surface treatment of combining a composite containing any one or more of silicon compounds such as SiC, SiN, SiO, and SiON with a base material, treatment of producing amorphous of, for example, $TiO_2$, $Al_2O_3$, $SiO_2$, or $ZrO_2$, and surface treatment of forming a film made of fluorine resin such as PTI-B, molybdenum disulfide, or the like.

In the hydrophilic surface treatment, for example, a hydrophilic functional group is provided by using fluorine resin or the like into which a hydrophilic functional group such as a sulfonate group or a carboxyl group is introduced. In other methods, for example, the base material is provided with water thermal treatment, ultraviolet irradiation, or plasma treatment, or is provided with plasma treatment or texture treatment (that is, pearskin finish treatment) to achieve micro roughing.

In the present embodiment, the methods of the water-repellent surface treatment and the hydrophilic surface treatment are not particularly limited. Various kinds of the water-repellent surface treatment and the hydrophilic surface treatment are known, and thus further detailed description thereof is omitted.

As described above, when the water-repellent film 37 and the hydrophilic film 38 are formed on the high-temperature side and the low-temperature side, respectively, in the gas path 34, deposit can be effectively removed in accordance with the deposit characteristics, and deposit accumulation can be reduced.

Specifically, movement of water in the gas path 34 is promoted on the high-temperature side so that the storage amount of water is decreased. When water is accumulated on the high-temperature side, it is difficult to achieve oxidation and dissipation of high-temperature lacquer and deposit. Thus, the water-repellent property is increased to prompt water ejection, and the temperature of the gas path surface is increased to promote deposit peeling.

On the low-temperature side, in particular, low-temperature lacquer and non-solid deposits are generated in large amounts. Water dissolution is effective for these deposits. In addition, peeling of the deposit can be promoted as water penetrates between the gas path surface and the deposit. Thus, the hydrophilic film 38 is formed on the low-temperature side through the hydrophilic surface treatment, thereby effectively dissipating the deposit.

Second Embodiment

The entire configuration of a system and the configuration of the EGR cooler 22 according to a second embodiment are identical to those in the first embodiment. As described in the first embodiment, the plurality of fins 35 are disposed on the gas path 34 of the EGR cooler 22. In the second embodiment, the water-repellent portion coated with the water-repellent film 37 and the hydrophilic portion coated with the hydrophilic film 38 are provided on the surface of each fin 35 so that the water-repellent property differs between the high-temperature side and the low-temperature side in the gas path 34.

Figure 12:
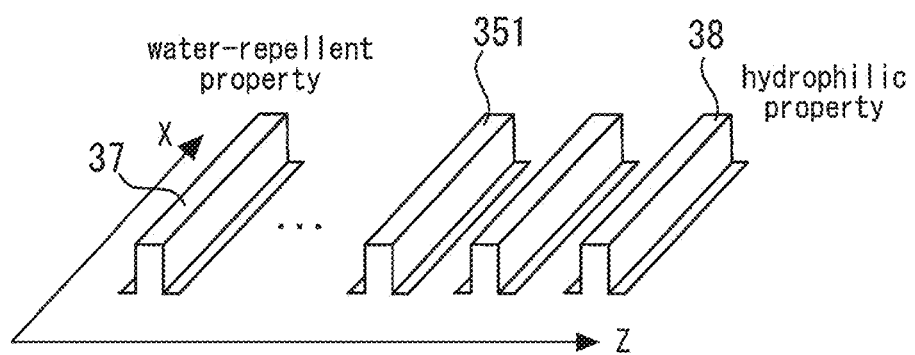
FIG. 12 is a diagram schematically illustrating an exemplary fins disposed on a gas path of an EGR cooler according to a second embodiment of the present disclosure.
Figure 13:
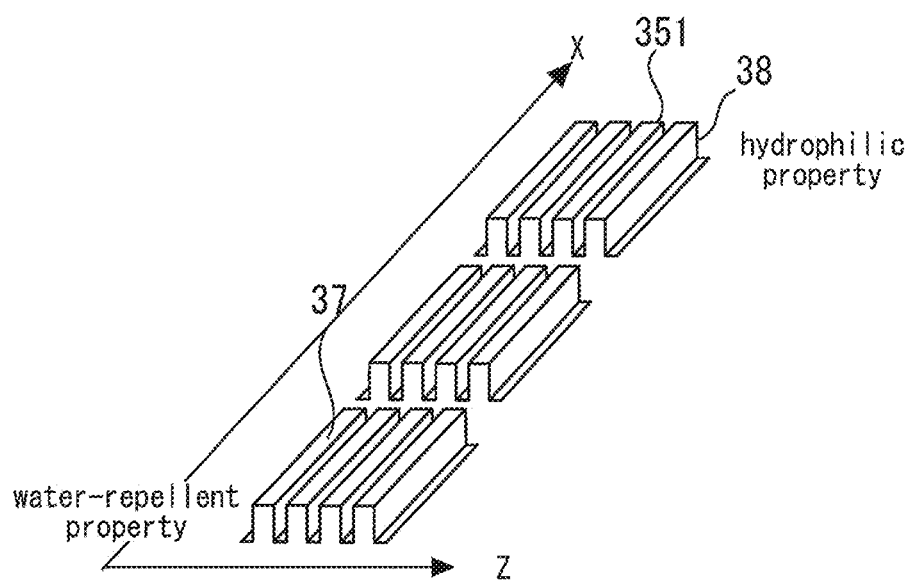
FIG. 13 is a diagram schematically illustrating an exemplary fins disposed on the gas path of the EGR cooler according to the second embodiment of the present disclosure.

FIGS. 12 and 13 illustrate exemplary fins 35 disposed on the gas path 34 of the EGR cooler 22. The fins 35 are formed as a plurality of divided parts for one gas path 34. Specifically, in an example illustrated in FIGS. 12 and 13, the fins 35 are formed by swaging and coupling a plurality of members 351 arrayed in parallel to each other in the X direction and each having a convex YZ section. The fins 35 before the members 351 are coupled are divided into a plurality of parts each having a convex portion in the Z-axis direction and divided into, for example, three parts in the X direction as illustrated in FIGS. 12 and 13.

Each member 351 is provided in advance with surface treatment for forming the water-repellent film 37 or the hydrophilic film 38. Each member 351 on which the water-repellent film 37 is formed is disposed at a position at which the average surface temperature is estimated to be equal to or higher than 100° while the EGR cooler 22 is actuated when the member is installed in the gas path 34 of the EGR cooler 22. Each member 351 on which the hydrophilic film 38 is formed is disposed at a position at which the average surface temperature is estimated to be lower than 100° while the EGR cooler 22 is actuated. Thus, a larger number of members 351 on each of which the water-repellent film 37 is formed are disposed on the origin side on the XZ plane, and a larger number of members 351 on which the hydrophilic film 38 is disposed are disposed on the positive sides of the X and Z axes.

When the fins 35 formed in this manner are disposed on the gas path 34, the water-repellent property is increased on the high-temperature side in the gas path 34. In addition, the hydrophilic property is increased on the low-temperature side in the gas path 34. Accordingly, deposit accumulation can be effectively reduced.

In the second embodiment, the fins 35 are divided into a plurality of parts each having a convex portion in a direction parallel to the Z axis and divided into three parts in the direction parallel to the X axis. However, the number of fin divisions is limited thereto. When the division is finely made, the boundary between the water-repellent film and the hydrophilic film can be defined closer to the temperature distribution, but the number of processes increases. Thus, the number of processes in formation of the fins 35 can be reduced by reducing the number of divisions.

The water-repellent property and the hydrophilic property may be changed at stages in accordance with the temperature distribution. Specifically, surface treatment with water-repellent properties different from each other may be provided to a plurality of members, respectively. Then, a member having a higher water-repellent property may be disposed on a side on which the temperature of the gas path surface is higher, and a member having a higher hydrophilic property may be disposed on a side on which the temperature is lower. In this manner, the water-repellent property may be changed at stages in accordance with the temperature distribution.

Third Embodiment

Figure 14:
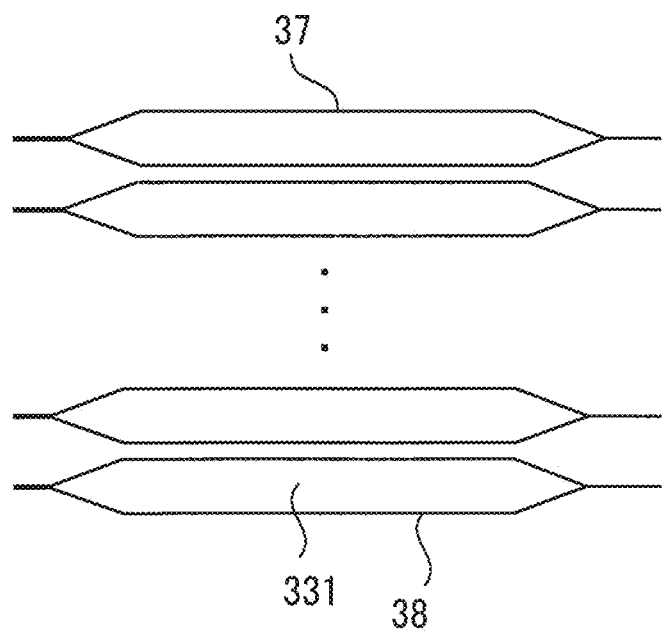
FIG. 14 is a diagram illustrating an exemplary arrangement of tubes in an EGR cooler according to a third embodiment of the present disclosure.

FIG. 14 is a diagram for description of the EGR cooler according to the present embodiment. The entire configuration of a system and the configuration of the EGR cooler 22 according to the present embodiment are identical to those in the first embodiment. As described in the first embodiment, the refrigerant path 33 of the EGR cooler 22 includes a plurality of stacked tubes 331. In the present embodiment, the water-repellent film 37 or the hydrophilic film 38 is formed on the outside of each tube 331, in other words, on the inner wall surface of the gas path 34 so that the water-repellent property of the gas path 34 differs between the high-temperature side and the low-temperature side.

In the present embodiment, the tubes 331 are stacked in a vertical direction (Y-axis direction). As described in the first embodiment, the refrigerant inlet is disposed on the lower side (Y-axis origin side), and the refrigerant outlet is disposed on the upper side. Thus, among the tubes 331, the water-repellent film 37 is formed on each tube 331 disposed on the upper side, and the hydrophilic film 38 is formed on each tube 331 disposed on the lower side, thereby forming the gas path 34 having a water-repellent property that changes in the Y-axis direction.

In order to change the water-repellent property in the X-axis direction and the Z-axis direction, different surface treatments are performed on each tube 331 by masking or the like. Specifically, with a boundary set to a part at which the temperature of the gas path surface becomes equal to 100° while the EGR cooler 22 is actuated, the water-repellent film 37 is formed in a region in which the temperature is equal to or higher than 100° while a region in which the temperature is lower than 100° is masked. Similarly, the hydrophilic film 38 is formed while the region in which the temperature is equal to or higher than 100° is masked. Accordingly, the water-repellent portion and the hydrophilic portion are formed also in the X-axis direction and the Z-axis direction.

The configuration described in the present third embodiment, in which the water-repellent film 37 and the hydrophilic film 38 are provided on the inner wall surface of the gas path 34 (that is, on the outer wall of each tube 331), may be combined with the configuration of the fins 35 described in the second embodiment. Accordingly, the water-repellent property can be increased on the high-temperature side, and the hydrophilic property can be increased on the low-temperature side, thereby effectively achieving deposit reduction.

In the third embodiment, the water-repellent film 37 or the hydrophilic film 38 is formed outside of the tubes 331. However, surface treatment with water-repellent properties or hydrophilic properties different from each other may be provided to a plurality of regions in a divided manner so that the water-repellent property gradually decreases from the high-temperature side to the low-temperature side.

In the present embodiment, each tube 331 is used as the refrigerant path 33, and the outside of the tube 331 is used as the gas path 34. However, the tube may be used as the gas path, and the outside of the tube as the gas path 34 may be used as the refrigerant path. In this case, too, the hydrophilic film or the water-repellent film may be formed in a similar manner on the inner wall surface of the tube as the gas path 34 in accordance with the temperature distribution.

Fourth Embodiment

Figure 15:
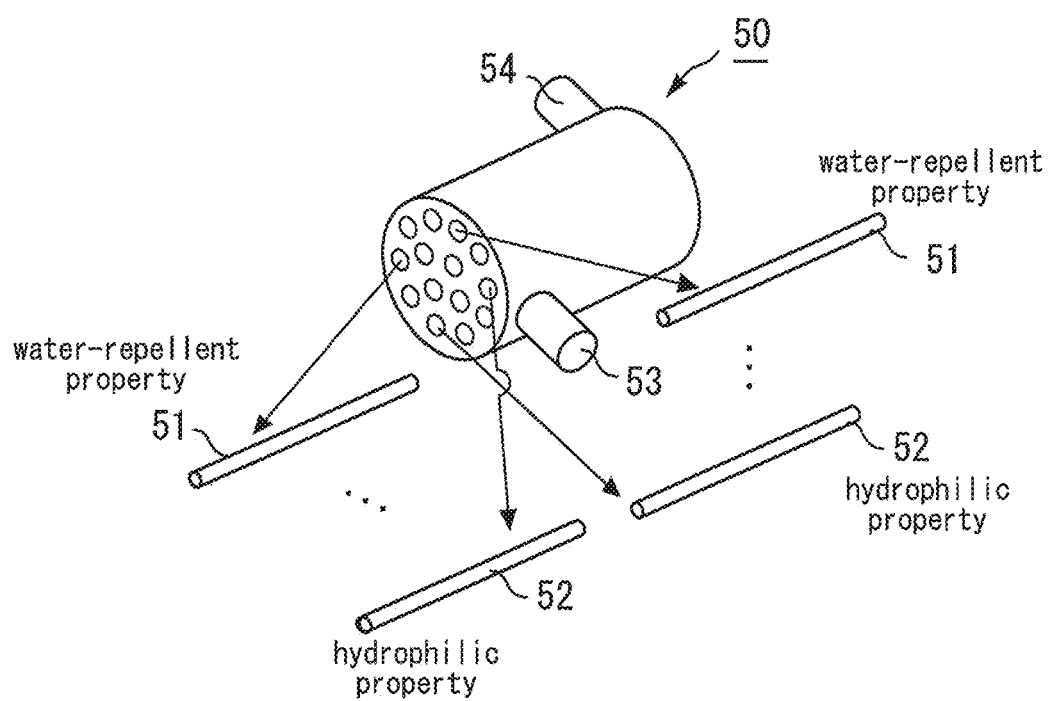
FIG. 15 is a diagram schematically illustrating an exemplary configuration of an EGR cooler according to a fourth embodiment of the present disclosure.

FIG. 15 is a diagram for description of an EGR cooler according to a fourth embodiment. The configuration of a system according to the fourth embodiment is identical to that of the first embodiment except that a multi-tube EGR cooler 50 as illustrated in FIG. 15 is used in place of the EGR cooler 22.

In the EGR cooler 50 illustrated in FIG. 15, the gas path includes a plurality of gas pipes 51 and 52. The gas pipe 51 includes a water-repellent film formed on an inner wall surface, and the gas pipe 52 includes a hydrophilic film formed on an inner wall surface. Which of the gas pipes 51 and 52 is to be disposed is determined in accordance with arrangement of a refrigerant inlet 53 and a refrigerant outlet 54. Specifically, as illustrated in FIG. 15, the temperature is relatively low on the lower side and the right side in the sheet of FIG. 15, which are closer to the refrigerant inlet 53, and thus the gas pipe 52 on which the hydrophilic film is formed is used on these sides. The gas pipe 51 on which the water-repellent film is formed is used as each gas pipe disposed on the upper side and the left side in the sheet of FIG. 15, which are closer to the refrigerant outlet 54.

As described above, the gas pipe 51, the inner wall surface of which is covered by the water-repellent film, and the gas pipe 52, the inner wall surface of which is covered by the hydrophilic film, can be used to differentiate the hydrophilic property and the water-repellent property of the gas path surface in accordance with the temperature distribution at least on a plane orthogonal to the gas path 34. Thus, deposit accumulation can be reduced also in the multi-tube EGR cooler 50.

Fifth Embodiment

Figure 16:
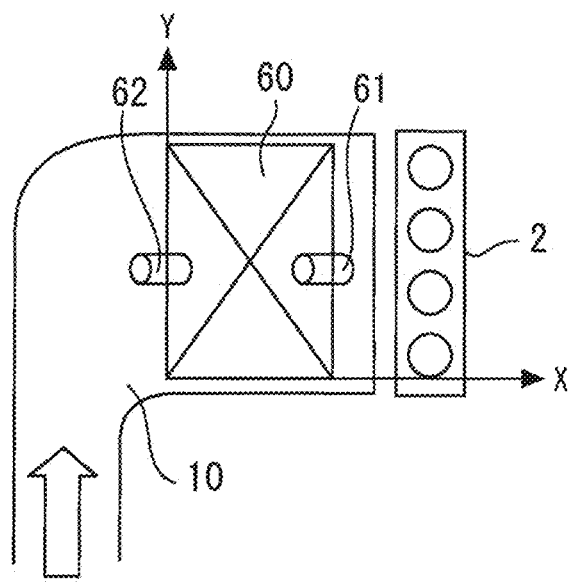
FIG. 16 is a diagram schematically illustrating an exemplary configuration of an intercooler according to a fifth embodiment of the present disclosure.

FIG. 16 is a diagram schematically illustrating the configuration of a system according to the present embodiment. The system according to a fifth embodiment has a configuration identical to that of the system in FIG. 1 except that an intake manifold integrated intercooler 60 is provided in place of the intercooler 14 in FIG. 1.

When a heat exchanger disposed on the intake path is disposed downstream of the part at which the EGR path 20 and the intake path 10 merge with each other in the flow of intake air, like the intake manifold integrated intercooler 60 as illustrated in FIG. 16, part of exhaust gas is introduced into a gas path of the heat exchanger together with intake air. Thus, similarly to the cases of the EGR cooler 22 or 50 described in Embodiments 1 to 4, deposit is potentially generated in the gas path of that kind of a heat exchanger.

To reduce the deposit, the gas path surface of the intercooler 60 in FIG. 16 is provided with the water-repellent surface treatment or the hydrophilic surface treatment in accordance with the temperature distribution in the gas path of the intercooler 60. Specifically, the water-repellent film is formed on the high-temperature side on which the gas path surface of the intercooler 60 has an average temperature equal to or higher than 100° while the intercooler 60 is actuated, and the hydrophilic film is formed on the low-temperature side on which the average temperature is lower than 100°.

Intake gas introduced to the intercooler 60 flows from the downstream side in the intake path 10 to the engine 2. Specifically, in a top view in FIG. 16, the gas flows in the gas path of the intercooler 60 in the X-axis positive direction.

Figure 17:
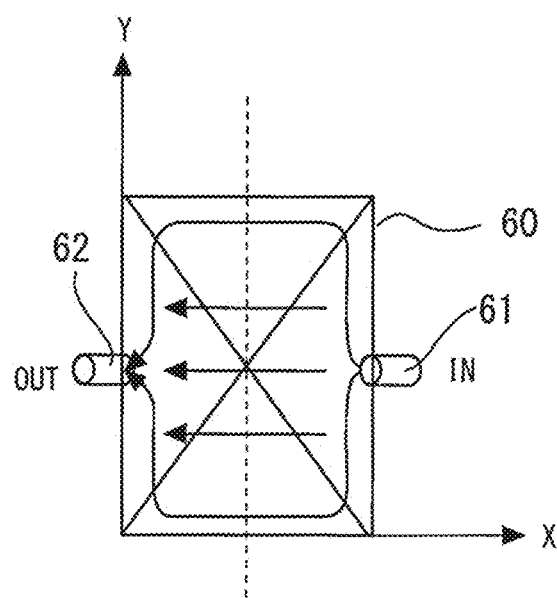
FIG. 17 is a diagram illustrating a flow of refrigerant in refrigerant path of an intercooler according to the fifth embodiment of the present disclosure.

FIG. 17 illustrates the flow of refrigerant in the refrigerant path of the intercooler 60. As illustrated in FIG. 17, a refrigerant inlet 61 of the intercooler 60 is provided on a side surface on the X-axis positive side, and a refrigerant outlet 62 is provided near the center of a side surface on the X-axis origin side. Thus, in the intercooler 60, the refrigerant circulates from the X-axis positive side to the origin side.

However, the temperature distribution in a case of the intercooler 60 is largely affected by other components and mounting conditions. Thus, the surface temperature distribution of the gas path of the intercooler 60 does not depend only on the circulation direction of intake gas in the gas path and the circulation direction of refrigerant in the refrigerant path. For example, a side surface of an intake manifold is cooled by external air under engine mounting conditions in the fifth embodiment, and thus the intercooler 60 has a low temperature on a side closer to a side surface.

Figure 18:
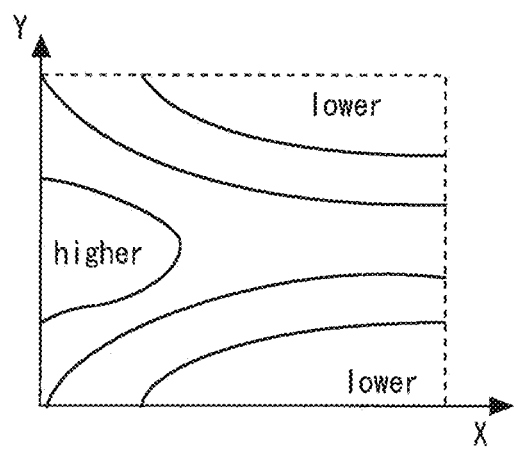
FIG. 18 is a diagram illustrating a temperature distribution of a gas path surface of an intercooler according to the fifth embodiment of the present disclosure.

FIG. 18 is a diagram illustrating the temperature distribution of the surface of the gas path of the intercooler 60. As illustrated in FIG. 18, the surface temperature distribution of the gas path of the intercooler 60 has a high-temperature region on the X-axis origin side, which is the gas inlet side and the refrigerant outlet side, and has low-temperature regions near both side surfaces on the Y-axis origin side and the positive side due to influence of cooling from a side closer to the side surface of the intake manifold.

Figure 19:
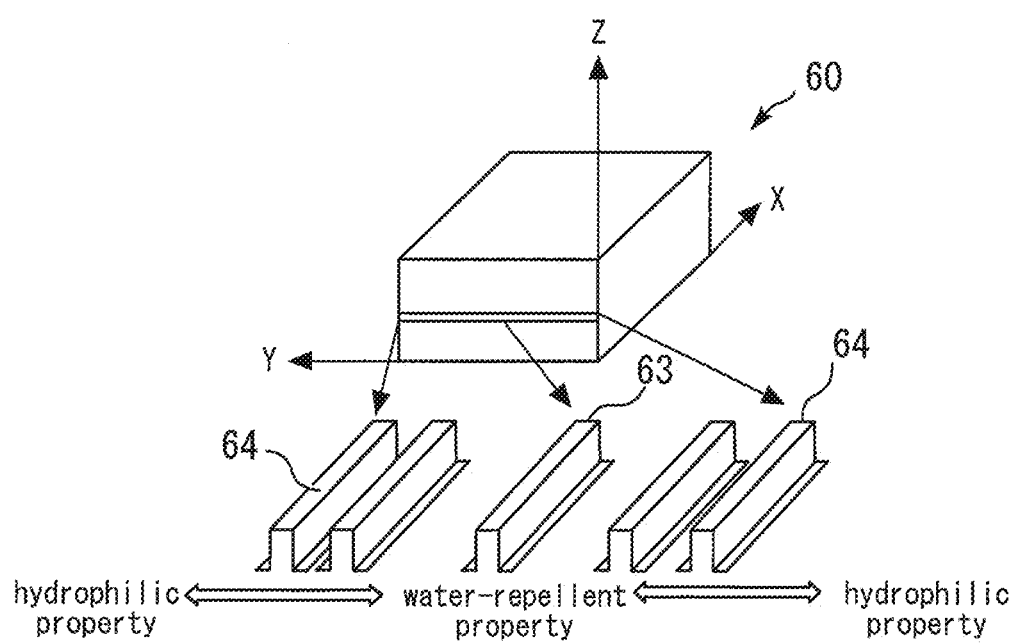
FIG. 19 is a diagram illustrating an exemplary arrangement of fins in a gas path of an intercooler according to the fifth embodiment of the present disclosure.

FIG. 19 is a diagram for description of an exemplary configuration of a fin installed on the gas path of the intercooler 60. As illustrated in FIG. 19, the fin is formed by swaging and integrating a fin 63 on which a water-repellent film is formed and a fin 64 on which a hydrophilic film is formed. The fins 63 and 64 are each disposed so that the longitudinal direction thereof is parallel to the X axis so that the intercooler has a concave-convex YZ sectional shape. On the XY plane, the fin 63 on which the water-repellent film is formed is disposed near a central part in the Y-axis direction, and the fins 64 on each of which the hydrophilic film is formed are disposed on both sides of the fin 63.

With this configuration, the water-repellent film or the hydrophilic film is formed on the gas path of the intercooler 60 in accordance with the surface temperature distribution thereof. Accordingly, deposit accumulation can be effectively reduced.

In the fifth embodiment, the hydrophilic property and the water-repellent property are changed only in the Y-axis direction. However, embodiments in the present disclosure is not limited thereto, and the water-repellent property and the hydrophilic property of the gas path surface may be changed in the X-axis direction or the Z-axis direction. For example, as illustrated in FIG. 13, the fins as a plurality of divided parts may be provided with the water-repellent surface treatment or the hydrophilic surface treatment as appropriate in the X-axis direction so that the water-repellent property changes in the X-axis direction. More specifically, in the fifth embodiment, since the gas inlet and the refrigerant outlet are installed on the X-axis origin side, for example, the number of fins 63 on each of which the water-repellent film is formed is larger on a side closer to the Y axis than on a side farther from the Y axis, and the number of fins 64 on each of which the hydrophilic film is formed is larger on the side farther from the Y axis than on the side closer to the Y axis. Accordingly, a fin configuration having a water-repellent property distribution closer to the temperature distribution can be achieved, thereby more effectively reducing deposit adhesion.

The fifth embodiment describes an example with the intake manifold integrated intercooler 60. However, the intercooler is not limited to an intake manifold integrated intercooler, but may be another intercooler. For example, some engines having low-pressure loop EGR (LPL-EGR) have a configuration in which an EGR gas path joins an intake path downstream of the intercooler in the flow of intake air. When the configuration of the present embodiment is applied to the intercooler mounted on an engine having such a configuration, deposit can be effectively reduced.

In the present embodiment, the intercooler 60 is of a fin type, and a fin provided with the water-repellent surface treatment and a fin provided with the hydrophilic surface treatment are used in accordance with the temperature distribution to provide the water-repellent portion and the hydrophilic portion in the gas path, thereby reducing deposit. However, the third embodiment may be applied to the intercooler 60 to provide the surface of each tube with the water-repellent surface treatment or the hydrophilic surface treatment, thereby achieving a heat exchanger having the water-repellent property and the hydrophilic property in accordance with the temperature distribution. Alternatively, a multi-tube heat exchanger having the water-repellent property and the hydrophilic property in accordance with the temperature distribution as described in the fourth embodiment may be installed as the intercooler.

What is claimed is:

1. A heat exchanger installed on an intake path or exhaust path of an internal combustion engine and configured to transfer heat between gas containing exhaust and refrigerant, the heat exchanger comprising:
   a gas path through which the gas flows; and
   a refrigerant path through which the refrigerant flows, wherein
   a water-repellent portion provided with water-repellent treatment is formed at part of a portion that contacts the gas in the gas path, and
   a hydrophilic portion provided with hydrophilic treatment is formed at part of the portion that contacts the gas in the gas path, the part being different from the water-repellent portion and having a temperature lower than the temperature of the water-repellent portion while the heat exchanger is actuated, wherein a portion of the gas path having a temperature higher than a boundary temperature, measured between the water-repellant portion and the hydrophilic portion, while the heat exchanger is actuated is free of the hydrophilic portion, wherein the water-repellent portion is positioned downstream of the hydrophilic portion in flow of the refrigerant through the refrigerant path.

2. The heat exchanger according to claim 1, wherein the water-repellent portion is positioned upstream of the hydrophilic portion in flow of the gas through the gas path.

3. The heat exchanger according to claim 1, further comprising a heat-releasing fin disposed in the gas path, wherein the water-repellent portion and the hydrophilic portion are formed at parts different from each other on a surface of the fin.

4. The heat exchanger according to claim 1, wherein the water-repellent portion and the hydrophilic portion are formed at parts different from each other on an inner wall surface of the gas path.

5. The heat exchanger according to claim 1, wherein the water-repellent portion is formed at a part at which the gas path is estimated to have a surface temperature equal to or higher than a reference temperature during an operation after the internal combustion engine on which the heat exchanger is mounted is warmed up.

6. The heat exchanger according to claim 1, wherein the hydrophilic portion is formed at a part at which the gas path is estimated to have a surface temperature lower than a reference temperature during an operation after the internal combustion engine on which the heat exchanger is mounted is warmed up.

7. A heat exchanger installed on an intake path or exhaust path of an internal combustion engine and configured to transfer heat between gas containing exhaust and refrigerant, the heat exchanger comprising:
- a gas path through which the gas flows; and
- a refrigerant path through which the refrigerant flows, wherein
- a water-repellent portion provided with water-repellent treatment is formed at part of a portion that contacts the gas in the gas path, and
- a hydrophilic portion provided with hydrophilic treatment is formed at part of the portion that contacts the gas in the gas path, the part being different from the water-repellent portion and having a temperature lower than the temperature of the water-repellent portion while the heat exchanger is actuated, wherein a portion of the gas path having a temperature higher than a boundary temperature, measured between the water-repellant portion and the hydrophilic portion, while the heat exchanger is actuated is free of the hydrophilic portion, wherein
- the gas path includes a plurality of pipes disposed in parallel to each other in the heat exchanger,
- the water-repellent portion is formed on inner wall surfaces of some of the plurality of pipes,
- the hydrophilic portion is formed on some other pipes of the plurality of pipes, the other pipes being different from the pipes on which the water-repellent portion is formed, and
- the other pipes on which the hydrophilic portion is formed are disposed at a part having a temperature lower than the temperature of a part at which the pipes on which the water-repellent portion is formed are disposed while the heat exchanger is actuated.

8. The heat exchanger according to claim 7, wherein the water-repellent portion is formed at a part at which the gas path is estimated to have a surface temperature equal to or higher than a reference temperature during an operation after the internal combustion engine on which the heat exchanger is mounted is warmed up.

9. The heat exchanger according to claim 7, wherein the hydrophilic portion is formed at a part at which the gas path is estimated to have a surface temperature lower than a reference temperature during an operation after the internal combustion engine on which the heat exchanger is mounted is warmed up.

* * * * *